United States Patent [19]

Coran et al.

[11] Patent Number: 4,487,888

[45] Date of Patent: Dec. 11, 1984

[54] PHENOLIC MODIFIED URETHANE ELASTOMER

[75] Inventors: Aubert Y. Coran; Raman Patel, both of Akron, Ohio

[73] Assignee: Monsanto Company, St. Louis, Mo.

[21] Appl. No.: 515,741

[22] Filed: Jul. 21, 1983

Related U.S. Application Data

[62] Division of Ser. No. 361,282, Mar. 24, 1982.

[51] Int. Cl.³ .................... C08F 8/00; C08G 69/48; C08L 77/00; C08L 75/00
[52] U.S. Cl. .................... 525/132; 525/66; 525/404; 525/424
[58] Field of Search ............ 525/132, 424, 66, 404

[56] References Cited

U.S. PATENT DOCUMENTS

| | | | |
|---|---|---|---|
| 3,028,353 | 4/1962 | Elmer et al. | 525/456 |
| 3,363,025 | 1/1968 | Fitka et al. | 525/429 |
| 3,489,701 | 1/1970 | Lee | 525/429 |
| 3,763,272 | 10/1973 | Lee | 525/429 |
| 4,278,572 | 4/1982 | Coran et al. | 428/361 |
| 4,338,411 | 7/1982 | Coran et al. | 525/145 |

*Primary Examiner*—John C. Bleutge
*Assistant Examiner*—A. L. Carrillo
*Attorney, Agent, or Firm*—Larry R. Swaney

[57] ABSTRACT

Urethane elastomer is described having methylol phenolic groups grafted thereto which modified elastomer is useful for preparing improved polymer blends.

6 Claims, No Drawings

PHENOLIC MODIFIED URETHANE ELASTOMER

This is a division of application Ser. No. 361,282, filed Mar. 24, 1982.

This application relates to improved urethane elastomers, in particular, urethane elastomers modified by reaction with methylol phenolic material.

BACKGROUND OF THE INVENTION

Urethane elastomer may be blended with plastic resin, for example nylon, to improve its impact strength. However, sometimes the presence of urethane elastomer, especially at high levels, adversely affects tensile properties. This effect is believed to be due to inherent incompatibility between the two polymers. Accordingly, if the urethane elastomer can be modified to improve its compatibility, improved polymer blends will result.

SUMMARY OF THE INVENTION

It has now been discovered that a urethane elastomer having methylol phenolic groups grafted thereto, may be prepared by the reaction of the urethane elastomer with methylol phenolic material in the presence of activator. It is believed that the activator promotes graft formation in which the methylol phenolic material is linked through a methylene bridge to the urethane elastomer. The resulting modified elastomer has methylol phenolic groups grafted thereto. Some of the methylol phenolic groups may be pendant to the polymer chain, each being attached by a single link, whereas, other methylol phenolic groups may form links between two urethane polymer molecules.

The improved grafted urethane elastomers of the invention may be conveniently prepared by masticating (by the use of conventional plastic masticating equipment such as mills, Banbury mixers, or Twin Screw extruders, at a temperature above the softening point of the urethane elastomer for a period of about 1–20 minutes) 0.1–20 parts by weight of methylol phenolic material, 100 parts by weight of a urethane elastomer, and a graft forming amount of an activator. Typically, the methylol phenolic material contains about 1–40 weight percent of methylol groups (—CH$_2$OH). The activator is generally present in amounts of about 0.1–50 parts by weight of methylol phenolic material. Preferred grafted elastomers of the invention comprise urethane elastomers (having methylol phenolic material grafted thereto) which are prepared by the reaction of about 0.5–15 parts by weight methylol phenolic material, containing about 5–35 weight percent methylol groups, with 100 parts by weight of urethane elastomer. The reaction takes place in the presence of 0.005–4 parts by weight of an activator, preferably a Lewis Acid. The amount of dimethylol phenolic material is limited to avoid extensive cross-linking of the urethane elastomer so that the resulting urethane elastomer having methylol phenolic groups grafted thereto remains thermoplastic.

Suitable urethane elastomers include essentially linear polymers comprising rubbery diol and diisocyanate derived segments. A portion of the diol may be provided by a low molecular weight diol. The rubbery diol segments may comprise either polyether or polyester segments. Either millable gums or thermoplastic polyurethane elastomers are satisfactory. Urethane elastomers are described in detail in *Encyclopedia of Polymer Science and Technology*, Vol. 11, pages 506–563, the disclosure of which is incorporated herein by reference. Commercially available urethane elastomers are described in *Rubber World Blue Book*, 1981 Edition, Materials and Compounding Ingredients for Rubber, pages 401–406.

A methylol phenolic material which will form a graft with a urethane elastomer can be used in the practice of the invention. A suitable methylol phenolic material may be prepared by the condensation of unsubstituted phenol, a $C_1$–$C_{12}$ alkyl-p-substituted phenol or a halogen substituted phenol with an aldehyde, preferably formaldehyde, in an alkaline medium or by condensation of phenol dialcohols. Methylol phenolic materials include polymeric phenols containing up to 10 benzene rings, but preferred materials contain no more than three benzene rings. Especially preferred are methylol phenolic materials derived from dimethylol phenol substituted with $C_4$–$C_{12}$ alkyl groups preferably tertiary alkyl groups in the para position. Examples of satisfactory dimethylol phenolic materials are described in U.S. Pat. Nos. 2,972,600; 3,093,613; 3,287,440; 3,709,840; and 3,211,804, Column 5, lines 3–67, the disclosures of which are incorporated herein by reference. Halogenated, for example brominated, methylol phenolic materials are also suitable. These halogenated materials, at elevated temperatures in the presence of metal oxide such as zinc oxide, can form Lewis acid activators in situ. Suitable methylol phenolic materials are commercially available. For example, they may be purchased under the trade names of SP-1045, SP-1055, SP-1056, CRJ-352, and Arofene resins.

Any activator which promotes the graft formation between urethane elastomer and methylol phenolic material is suitable for the practice of the invention. Preferred activators are Lewis acids, which include the acid-acting metal halides such as boron trifloride, stannous chloride, zinc chloride, titanium tri- or tetrachloride, aluminum chloride, ferric chloride, ferric bromide, zinc bromide, aluminum bromide and complexes thereof. Suitable Lewis acids are described in U.S. Pat. No. 4,121,026, Columns 5–6, the disclosure of which is incorporated herein by reference.

The urethane elastomers of the invention having methylol phenolic groups grafted thereto are especially useful for preparing improved polymer blends comprising polymers having affinity for methylol phenolic groups. Thus, one embodiment of the invention comprises improved polymer blends, each comprising a blend of (a) about 1–99 parts by weight of urethane elastomer having methylol phenolic groups grafted thereto and (b) correspondingly, about 99–1 parts by weight of a polymer having an affinity for methylol phenolic groups. The methylol phenolic grafted urethane elastomer is the same as described above. The second component (b) of the improved blend can be any polymer having an affinity for methylol phenolic groups. In the sense as herein used, affinity means any attraction, whether chemical or physical, for methylol phenolic groups which enhances the compatibility between the (a) and (b) components. The second component polymer (b) may exhibit an affinity for either methylol groups or hydroxy groups or both. The aforesaid affinity results in a polymer blend exhibiting improved properties, for example, higher tensile strength, greater elongation or better impact strength.

Examples of suitable polymer (b) are polyamides, polyolefins, especially functionalized polyolefins, polyesters, acrylate resin, and hydrocarbon rubber (e.g., natural rubber, SBR rubber, EPDM rubber, etc). Preferred polyamides are nylons having molecular weights of at least about 5,000 or more, preferably 10,000, comprising segments derived from dicarboxylic acid and diamine, lactam, or amino acid. Suitable thermoplastic polyamides (nylons) comprise crystalline or resinous high molecular weight solid polymers, including copolymers and terpolymers having recurring amide units within the polymer chain. Polyamides may be prepared by polymerization of one or more epsilon lactams, such as caprolactam, pyrrolidenedione and amino undecanoic lactam, or amino acid, or by condensation of dibasic acids and diamines. Both fiber-forming and molding grades of the nylons are suitable. Examples of such polyamides are polycaprolactam (nylon-6), polylauryllactam (nylon-12), polyhexamethyleneazelamide (nylon-6,9), polyhexamethylenesebacamide (nylon-6, 10), polyhexamethyleneisophthalamide (nylon-6, IP) and the condensation product of 11-aminoundecanoic acid (nylon-11). Additional examples of satisfactory polyamides are described in Kirk-Othmer, *Encyclopedia of Chemical Technology*, Vol. 10, page 919 and *Encyclopedia of Polymer Science and Technology*, Vol. 10, pages 392-414. Commercially available thermoplastic polyamide may be advantageously used in the practice of the invention. A linear crystalline polyamide having a softening point or melting point between 160-230° C. is preferred.

Olefin polymers suitable for preparation of blends of the invention comprise amorphous or crystalline essentially saturated homopolymers or copolymers of $C_2$-$C_8$ alpha monoolefins. Thermoplastic crystalline olefin polymers are especially preferred. An important subgroup of olefin polymers comprise high molecular weight solid products from the polymerization of one or more monoolefins by either high pressure or low pressure processes. Examples of such polymers are the isotactic or syndiotactic monoolefin polymers, representative members of which are commercially available. Satisfactory olefins include ethylene, propylene, 1-butene, 1-pentene, 1-hexene, 2-methyl-1-propene, 3-methyl-1-pentene, 4-methyl-1-pentene, 5-methyl-1-hexene, and mixtures thereof. Commercially available thermoplastic polyolefin resins, such as polyethylene, polybutene-1, and polypropylene, or mixtures thereof, may be advantageously used in the practice of the invention with polypropylene being preferred. Also suitable for the practice of the invention are copolymers of two or more olefins with copolymers of ethylene and propylene being preferred.

Suitable thermoplastic polyesters comprise linear, crystalline, high molecular weight solid polymers having recurring

groups including

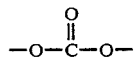

groups within the polymer chain. The term "linear" as used herein in respect to polyester means a polymer in which the recurring ester groups are within the polymer backbone and not pendant therefrom. Linear crystalline polyesters having melting points above 50° C. are satisfactory, with polyesters having melting points above 100° C. being preferred and with polyesters having melting points between 160-230° C. being more preferred. Saturated linear polyesters (free of olefinic unsaturation) are preferred. Many commercially available thermoplastic linear crystalline polyesters may be advantageously employed in the practice of the invention or they may be prepared by polymerization of one or more dicarboxylic acids, anhydrides, or esters and one or more diol. Examples of satisfactory linear polyesters are described in *Encyclopedia of Polymer Science and Technology*, Vol. 11, pages 68-73 and Korshak and Vinogradova, *Polyesters*, Pergammon Press, pages 31-64. The disclosures thereof are hereby incorporated by reference. Suitable polycarbonates are also commercially available. For suitable segmented poly(ether-co-terephthalates) see page 399, *Rubber World Blue Book*, supra. Polylactones such as polycaprolactone are satisfactory in the practice of the invention. Preferred polyesters of the invention are derived from aromatic dicarboxylic acids such as napthalenic or phthalic acids. More preferred polyesters are poly(alkylene terephthalates) especially poly(tetramethylene terephthalate), or mixed polyphthalates derived from two or more glycols, two or more phthalic acids, or two or more glycols and two or more phthalic acids such as poly(alkylene tere-coisophthalates).

Another embodiment of the invention relates to an improved compatibilized polymer blend comprising a blend of (a) urethane elastomer, (b) a polymer different from polymer (a), said polymer (b) having an affinity for methylol phenolic material and (c), in an amount sufficient to enhance the compatibility between polymers (a) and (b), urethane elastomer having methylol phenolic groups grafted thereto by links of the type formed in the presence of acidic activator. Typically, the improved compatibilized polymer blend comprises about 1-99 parts by weight of polymer (a) and correspondingly, about 99-1 parts by weight of polymer (b) and about 1-20 parts by weight of phenolic modified urethane elastomer (c) per 100 parts by weight of polymer (a). Preferably, polymer (b) is nylon. The improved polymer blends are prepared by masticating the three polymers by using conventional rubber masticating equipment. A sufficient amount of elastomer (c) must be used to enhance the compatibility between polymers (a) and (b). Polymer (a) and polymer (b) can be polymers which normally are completely or partially incompatible, but by the use of elastomer (c) the incompatibility is substantially reduced resulting in a compatibilized polymer blend which exhibits improved properties. The presence of the compatibilizing elastomer (c) can result in a more homogeneous blend containing a greater number of smaller sized dispersed polymer particles. Thus, the compatibilizing polymer accounts for the improved mechanical properties of the resulting blend.

The improved blends of the invention may be prepared by mixing the components, preferably above the melting point or softening point of each of the polymers, by using conventional masticating equipment, for example, rubber mills, Brabender mixers, Banbury mixers, or twin screw continuous mixer extruders. Mixing times necessary to obtain a homogeneous blend are satisfactory. If the polymer blend is obviously nonhomogeneous, additional mixing is required. When the blend components are thoroughly mixed, improved properties result.

The blend compositions of the invention are useful for making a variety of molded, extruded, or calendered articles. They are particularly useful in making articles by extrusion, compression molding, and injection molding techniques. The properties of a modified blend depend upon the proportions of the components in the blend with a wide range of properties available, simply by varying the proportions of the polymer components.

The stress-strain properties of the composition are determined in accordance with ASTM test procedures. Tests are carried out with microdumbbell tensile test specimens (ASTM D1708-66), each having a test length of 0.876 inches (2.23 cm.). An Instron tensile tester is used for tensile strength and ultimate elongation. The tester is designed to measure changes in jaw separation in inches. Though the initial jaw separation is adjusted (according to the ASTM procedure) to 0.90 inches (2.29 cm.) and the specimen length and jaw separation are not 1.00 inches (2.54 cm.), the elongation at break is read as the jaw separation increase in inches. The percent ultimate elongation or elongation at break is calculated by multiplying the change in jaw separation required to break the specimen (measured in inches) by 100. It is true that the original unstrained sample length was 0.876 inches (not 1.00 inches) and one might expect that the change (in inches) in jaw separation should be divided by 0.876 inches as well as being multiplied by 100. However, it is also true that some flow, in effect, somewhat increases the initial or unstrained length. Since the effective length change due to flow of the specimen in the jaws is difficult to measure in each case, and since the effect of this is in the opposite direction of not dividing by 0.876, it is found expedient to estimate the percent ultimate elongation or elongation at break, merely by multiplying the jaw separation to break (measured in inches) by 100. The actual value may deviate from this somewhat, however, the method presented herewith is incorporated into the definition for percent elongation used herein. Test specimens are pulled at 2.5 cm. per minute up to 30 percent elongation and 25.4 cm. per minute to failure.

DESCRIPTION OF THE PREFERRED EMBODIMENTS

The compositions of the invention are prepared by masticating the components in a Haake Rheomix or Brabender mixer at temperatures and mixing speeds indicated below. All amounts are parts by weight.

To prepare a urethane elastomer having methylol phenolic groups grafted thereto, 100 parts of urethane elastomer (Adiprene CM) are charged to the mixer and masticated for 2-3 minutes at 80 rpm with a stock temperature of about 180° C. Four parts of dimethylol-p-octylphenol (SP-1045) are added and mixing is continued for one minute. Activator, 0.8 parts of stannous chloride dihydrate, is then added and mixed for 3-4 minutes. During mixing, the stock temperature reaches about 195° C. Lastly, 0.32 parts of magnesium oxide is added (to neutralize any free acid) and the batch is mixed for one additional minute. In Stock 4, 0.2 parts of activator and 0.1 part of MgO are used. The mass is then removed and passed through a mill to form a sheet. The material is designated grafted urethane elastomer.

Polymer blends are prepared by masticating polymers in the indicated proportions in the mixer at 80 rpm with an oil bath temperature of about 180° C. A mixture is masticated for 3 minutes after the polymers are melted. The blend is removed from the mixer and cooled, then it is returned to the mixer and melt mixed for two additional minutes. Test specimens are prepared by compression molding the blend at 225° C. Control stocks are prepared by using virgin urethane elastomer. Nylon blends are prepared by using nylon 6,6-6, 6-10 terpolymer m.p. 160° C. (Zytel 63), 50% nylon 6, 31% nylon 6-6 and 19% nylon 6-10.

The data show that the blends containing urethane elastomer, having methylol phenolic groups grafted thereto, exhibit substantial improvements in properties including increases in tensile strength and true stress at break. The property improvement is indicative of enhanced compatibility between the two polymers.

TABLE 1

| | (Parts by Weight) | | | | | |
|---|---|---|---|---|---|---|
| | 1 | 2 | 3 | 4 | 5 | 6 |
| Urethane Elastomer | 30 | — | 50 | — | 70 | — |
| Grafted Urethane Elastomer | — | 30 | — | 50 | — | 70 |
| Nylon 6, 6-6, 6-10 | 70 | 70 | 50 | 50 | 30 | 30 |
| Properties | | | | | | |
| UTS, MPa | 24.7 | 45.1 | 0.1 | 16.7 | 0.6 | 4.2 |
| $M_{100}$, MPa | 6.5 | 19.2 | 0.9 | 13.6 | 0.6 | 0.7 |
| E, MPa | 79 | 704 | 3.6 | 280 | <10 | 21 |
| Elong., % | 380 | 420 | 270 | 250 | 890 | 460 |
| Tension Set, % | 82 | 85 | 80 | 75 | — | 6 |
| TSB, MPa | 119 | 235 | 0.4 | 58 | 5.9 | 24 |

Polymer blends are prepared as in Table 1 except nylon 11 is used and 1.8 parts of a stabilizer system is incorporated. The data is shown in Table 2. Stock 1 is a control containing virgin urethane elastomer (Adiprene CM). Stock 2 contains urethane elastomer having methylol phenolic groups grafted thereto (same as in Table 1). The composition containing grafted urethane elastomer exhibits improved properties.

TABLE 2

| | (Parts by Weight) | |
|---|---|---|
| | 1 | 2 |
| Urethane Elastomer | 60 | — |
| Grafted Urethane Elastomer | — | 60 |
| Nylon 11 | 40 | 40 |
| Properties | | |
| UTS, MPa | 6.3 | 10.1 |
| E, MPa | 134 | 121 |
| Elong., % | 26 | 88 |
| TSB | 7.9 | 19 |

Blends containing polypropylene are illustrated in Table 3.

TABLE 3

| | (Parts by Weight) | |
|---|---|---|
| | 1 | 2 |
| Urethane Elastomer | 60 | — |
| Grafted Urethane Elastomer | — | 60 |
| Polypropylene | 40 | 40 |
| Properties | | |
| TS, MPa | 5.1 | 8.9 |
| E, MPa | 122 | 172 |
| Elong., % | 30 | 88 |
| TSB, MPa | 6.6 | 17 |

Blends are prepared as before by melt mixing. Stock 1, a control, is a blend of virgin urethane elastomer (Adiprene CM) and virgin polypropylene (Profax 6723).

Stock 2 is a blend of virgin polypropylene and grafted urethane elastomer as described in Table 1. The data shows that blends containing methylol phenolic grafted urethane elastomer exhibits improved properties and gives a superior blend.

Methylol phenolic grafted urethane elastomers of the invention contain reactive sites for bonding to a variety of substrates. Depending upon the substrate, another agent may be required to link these reactive sites to the substrates.

Enhanced compatibility is achieved in polymer blends in which the methylol phenolic grafted urethane elastomer contains as little as 0.01 weight percent of methylol phenolic groups. Preferred grafted polymers of the invention contain between 0.1 and 10 weight percent of methylol phenolic groups.

Although the invention has been illustrated by typical examples, it is not limited thereto. Changes and modifications of the examples of the invention herein chosen for purposes of disclosure can be made which do not constitute departures from the spirit and scope of the invention.

The embodiments of the invention in which the exclusive property or privilege is claimed are defined as follows:

1. An improved polymer blend comprising a blend of (a) about 1–99 parts by weight of urethane elastomer having methylol phenolic groups grafted thereto by links of the type formed by the reaction of urethane elastomer and methylol phenolic material in the presence of acidic activator and (b) correspondingly, about 99–1 parts by weight of a polyamide having an affinity for methylol phenolic groups.

2. The blend of claim 1 in which polymer (a) is the reaction product of 0.1–20 parts by weight of a methylol phenolic material containing about 1–40 weight percent of methylol groups and 100 parts by weight of urethane elastomer in which the grafting reaction is carried out in the presence of a graft forming amount of an acidic activator.

3. The blend of claim 2 in which polymer (b) is a polyamide having a molecular weight of at least about ten thousand comprising segments derived from dicarboxylic acid, diamine, lactam, or amino acids.

4. The blend of claim 3 in which polymer (b) is nylon.

5. The blend of claim 4 comprising about 5–30 parts by weight of grafted urethane elastomer and about 70–95 parts by weight of nylon.

6. The blend of claim 5 in which the phenolic material is derived from dimethylol-p-$C_1$–$C_{12}$ alkylphenol.

* * * * *